United States Patent [19]
Chen

[11] Patent Number: 5,343,588
[45] Date of Patent: Sep. 6, 1994

[54] GEAR CLEANER FOR BICYCLES

[75] Inventor: Liu Chen, Changhua, Taiwan

[73] Assignee: Lu Goo Co., Ltd., Taiwan

[21] Appl. No.: 133,285

[22] Filed: Oct. 8, 1993

[51] Int. Cl.$^5$ .............................................. A46B 15/00
[52] U.S. Cl. .................................. 15/256.5; 280/158.1
[58] Field of Search ................... 15/256.5; 280/152.1, 280/158.1; 474/92

[56] References Cited

U.S. PATENT DOCUMENTS 719,608  2/1903  Peterson ........................... 280/158.1
4,955,850  9/1990  Lee ................................. 15/265.5 X

FOREIGN PATENT DOCUMENTS 32391 of 1910 United Kingdom ............. 280/158.1

Primary Examiner—Chris K. Moore
Attorney, Agent, or Firm—Beveridge, DeGrandi, Weilacher & Young

[57] ABSTRACT

A gear cleaner for cleaning the speed change gear of a bicycle, comprised a mounting device, and a brush fastened to the chain stays of a bicycle by the mounting device with the bristles thereof disposed in contact with the gear wheels of the speed change gear of the bicycle, the mounting device comprised of two pivoted clamping plates fastened around the chain stays by a screw bolt, the brush having a circular mounting rod transversely linked to the brush head thereof at one end and fitted into a mounting groove on the lower mounting plate of the mounting device.

1 Claim, 3 Drawing Sheets

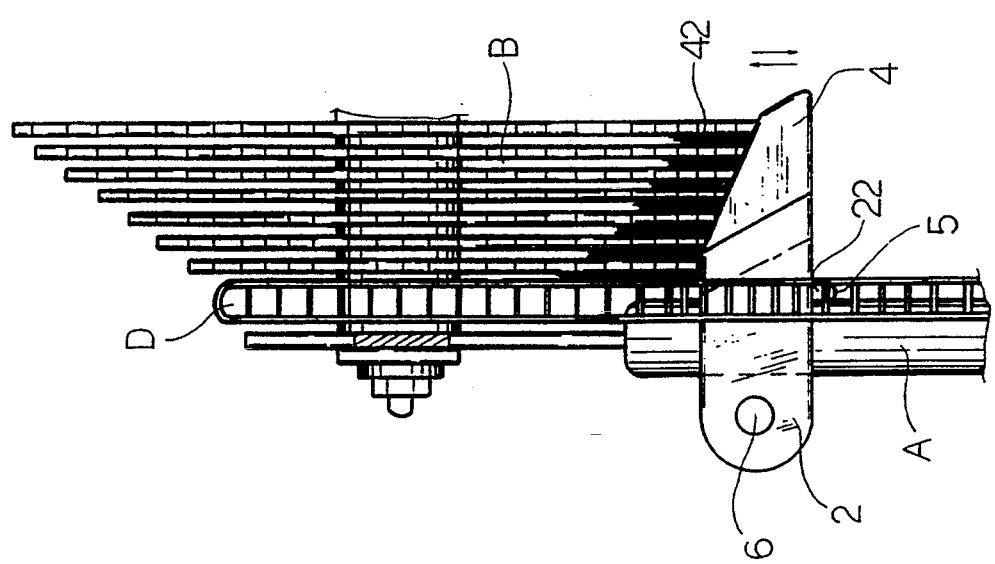

GEAR CLEANER FOR BICYCLES

BACKGROUND OF THE INVENTION

The present invention relates to a bicycle speed change gear cleaner fastened to the chain stays of a bicycle to clean the gear wheels of the speed change gear automatically during the running of the bicycle.

The gear wheels of the speed change gear of a bicycle must be regularly cleaned so as to prevent the chain from being stuck in the speed change gear. Because a bicycle's speed change gear consists of various gear wheels, it is not an easy job to clean the the speed change gear of a bicycle.

SUMMARY OF THE INVENTION

The present invention has been accomplished to provide a gear cleaner for a bicycle which automatically removes dirt from the gear wheels of the speed change gear of the bicycle as the bicycle is moving.

According to one aspect of the present invention, the gear cleaner is comprised of a mounting device, and a brush fastened to the chain stays of a bicycle by the mounting device with the bristles thereof disposed in contact with the gear wheels of the speed change gear of the bicycle, wherein the mounting device is comprised of two pivoted clamping plates fastened around the chain stays by a screw bolt.

According to another aspect of the present invention, the brush has a circular mounting rod transversely linked to the brush head thereof at one end and fitted into a mounting groove on the lower mounting plate of the mounting device.

BRIEF DESCRIPTION OF THE DRAWINGS

The present invention will now be described by way of example with reference to the annexed drawings, in which:

FIG. 3 is a top view taken on FIG. 2.

DETAILED DESCRIPTION OF THE PREFERRED EMBODIMENT

Figure 1:
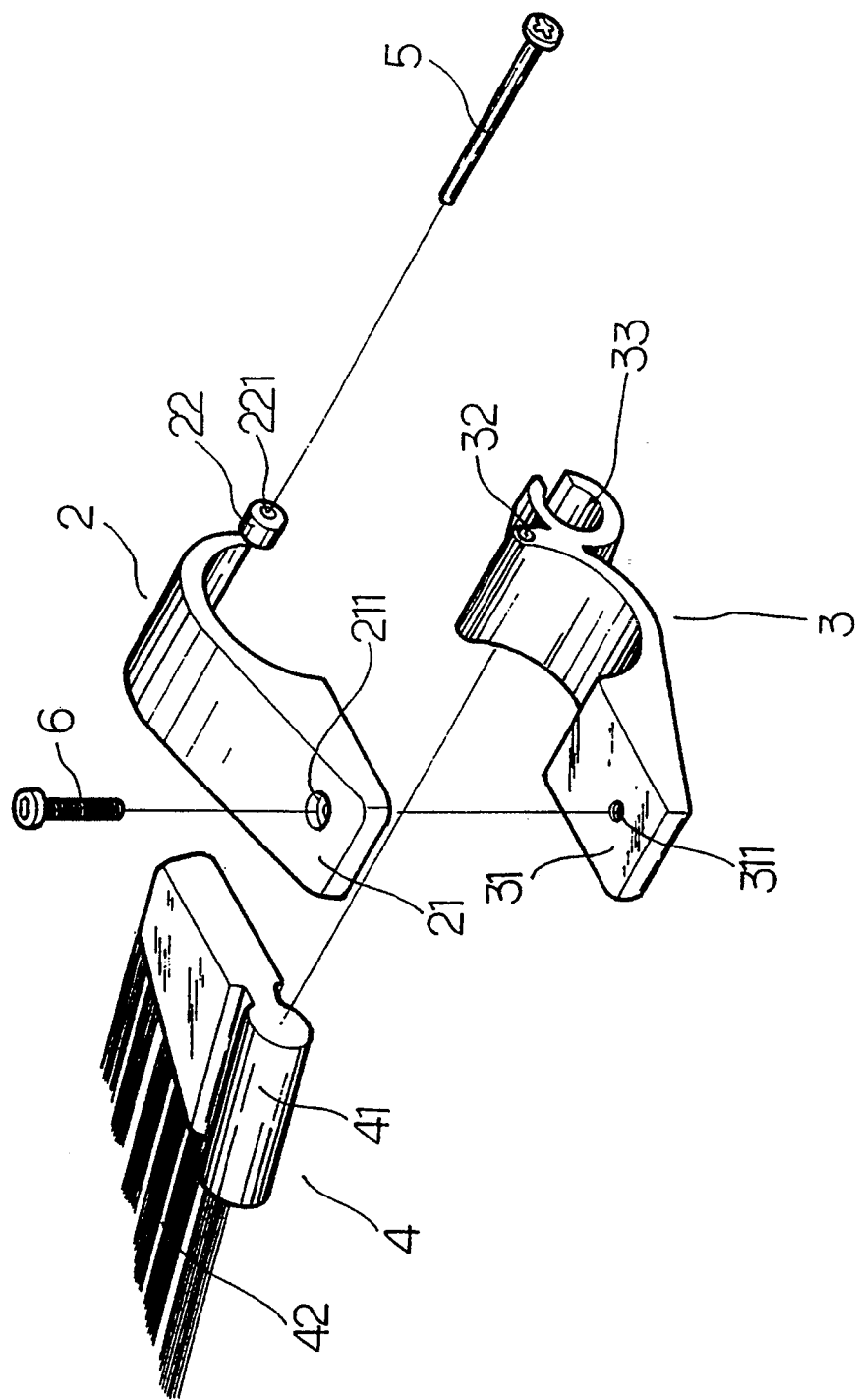
FIG. 1 is an exploded view of a gear cleaner according to the preferred embodiment of the present invention.

Referring to FIG. 1, a gear cleaner in accordance with the present invention is generally comprised of an upper clamping plate 2, a lower clamping plate 3, and a brush 4. The upper clamping plate 2 comprises a screw hole 211 through a flat mounting portion 21 thereof, and two opposite barrels 22 having a respective axle hole 221 aligned on the front end of a half-round clamping portion thereof at two opposite sides. The lower clamping plate 2 comprises a screw hole 311 through a flat mounting portion 31 thereof connected to the screw hole 211 on the upper clamping plate 2 by a screw bolt 6, a transverse pin hole 32 on the front end of a half-round clamping portion thereof connected between the two opposite barrels 22 of the upper clamping plate 2 by a pivot pin 5, and a mounting groove 33 made in a substantially C-shaped cross section and transversely disposed in front of the pin hole 32. The brush 4 comprises a circular mounting rod portion 41 at one end of the brush head thereof fitted into the mounting groove 33 on the lower clamping plate 3, and bristles 42 fastened in the brush head. Before threading the screw bolt 6 into the screw holes 211;311, the upper and lower clamping plates 2;3 are pivotably connected together by the pivot pin 5, and therefore the two clamping plates 2;3 can be conveniently mounted around the chain stays of a bicycle and then fastened up by the screw bolt 6.

Figure 2:
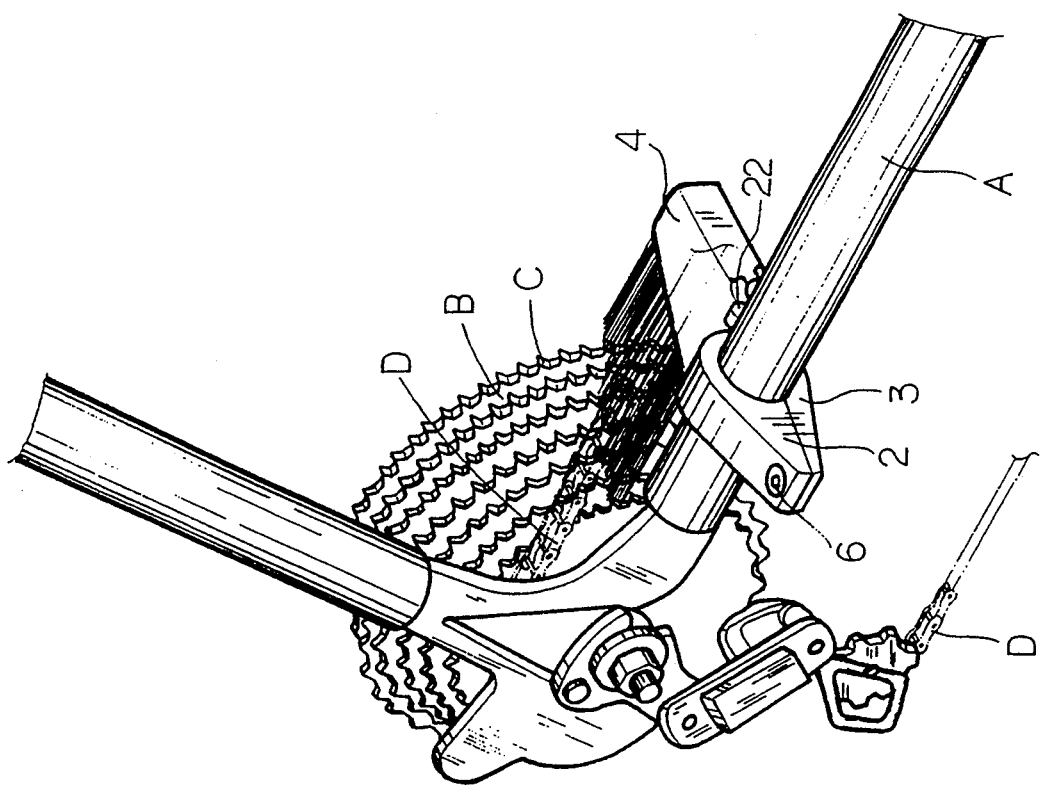
FIG. 2 is an installed view showing the gear cleaner fastened to a bicycle's chain stays.

Referring to FIGS. 2 and 3, the gear cleaner is fastened to a bicycle's chain stays A with the bristles 42 of the brush 4 disposed in contact with the gear wheels C of the speed change gear B. As the speed change gear B is rotated, dirt is removed from the gear wheels C of the speed change gear B by the bristles 42 of the brush 4 automatically.

What is claimed is:

1. A gear cleaner comprising:

a mounting device fastened to the chain stays of a bicycle, said mounting device comprised of an upper clamping plate and a lower clamping plate fastened together around the chain stays, said upper clamping plate comprising a flat mounting portion at one end and a half-round clamping portion at an opposite end mounted around the chain stays at the top, the flat mounting portion of said upper clamping plate having a screw hole, the half-round clamping portion of said upper clamping plate having two barrels aligned on a front end thereof at two opposite sides, said lower clamping plate comprising a flat mounting portion at one end and a half-round clamping portion at an opposite end mounted around the chain stays at the bottom, the flat mounting portion of said lower clamping plate having a screw hole connected to the screw hole on the flat mounting portion of said upper clamping plate by a screw, the half-round clamping portion of said lower clamping plate comprising a transverse pin hole connected between the two barrels of said upper clamping plate by a pivot pin, and a brush mounting groove made in a substantially C-shaped cross section and transversely disposed in parallel with said pivot pin;

a brush fastened to said mounting device, said brush comprising a circular mounting rod portion transversely linked to a brush head thereof at one end and fitted into the mounting groove on said lower clamping plate, and bristles fastened in the brush head and disposed in contact with the gear wheels of the speed change gear of the bicycle.

* * * * *